(12) United States Patent
Sisler et al.

(10) Patent No.: US 6,581,163 B1
(45) Date of Patent: Jun. 17, 2003

(54) MAINS LOSS DETECTION APPARATUS AND METHOD

(75) Inventors: John Sisler, Scotts Valley, CA (US); Samson K. K. Toy, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/457,114

(22) Filed: Dec. 7, 1999

(51) Int. Cl.[7] .............................. G06F 1/30; G06F 11/30
(52) U.S. Cl. ........................................ 713/310; 713/340
(58) Field of Search .................................. 713/310, 340

(56) References Cited

U.S. PATENT DOCUMENTS

| | | |
|---|---|---|
| 4,509,201 A | 4/1985 | Segigawa et al. |
| 5,058,710 A * | 10/1991 | Iwasa .......................... 187/290 |
| 5,283,792 A | 2/1994 | Davies et al. |
| 5,300,874 A | 4/1994 | Shimamoto et al. |
| 5,339,446 A | 8/1994 | Yamasaki et al. |
| 5,341,034 A * | 8/1994 | Matthews ................... 327/534 |
| 5,423,045 A | 6/1995 | Kannan et al. |
| 5,481,730 A | 1/1996 | Brown et al. |
| 5,553,138 A | 9/1996 | Heald et al. |
| 5,600,841 A | 2/1997 | Culbert |
| 5,684,998 A | 11/1997 | Enoki et al. |
| 5,761,084 A * | 6/1998 | Edwards ..................... 700/293 |
| 5,815,409 A * | 9/1998 | Lee et al. ................... 700/286 |
| 5,831,805 A | 11/1998 | Sekine et al. |
| 6,175,927 B1 * | 1/2001 | Cromer et al. .............. 713/300 |
| 6,298,449 B1 * | 10/2001 | Carter ......................... 713/340 |

* cited by examiner

Primary Examiner—Thomas Lee
Assistant Examiner—Eric Chang
(74) Attorney, Agent, or Firm—Jay A. Chesavage

(57) ABSTRACT

A power supply consumes mains power and has first outputs which produce an operational voltage for controlling a CPU and a primary link interface. The primary link interface is capable of sending a mains fail message through the primary link using only power from one of the first outputs. The power supply also produces second outputs for powering circuitry not related to the transmission of this power fail message. The power supply detects loss of mains power and signals this by pulling the second outputs to a signal voltage which may be near ground. The equipment powered by this supply detects the second output changing from an operational voltage to a signaling voltage, and sends this information to the CPU, which sends a power fail message across the primary link interface.

10 Claims, 3 Drawing Sheets

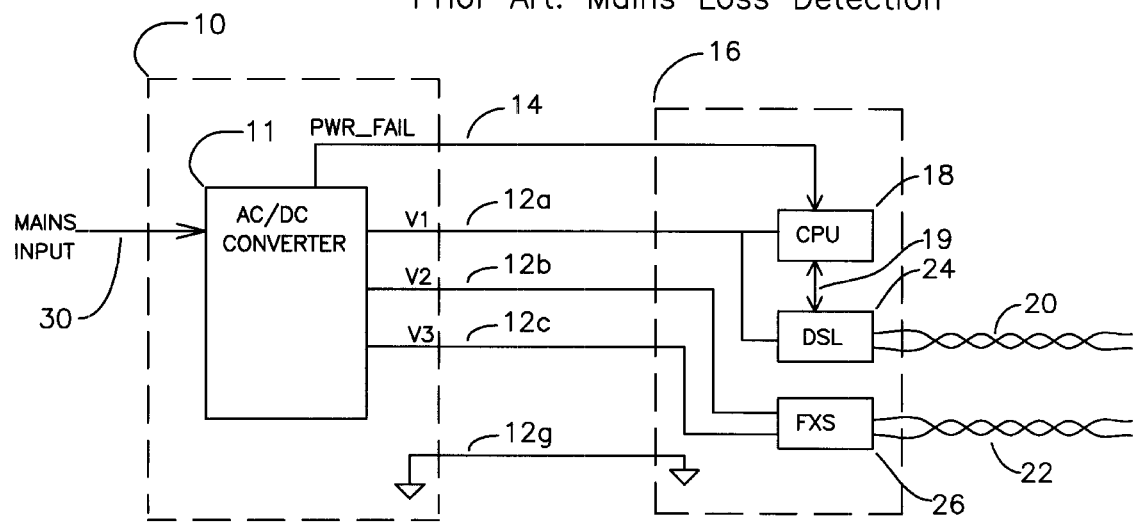
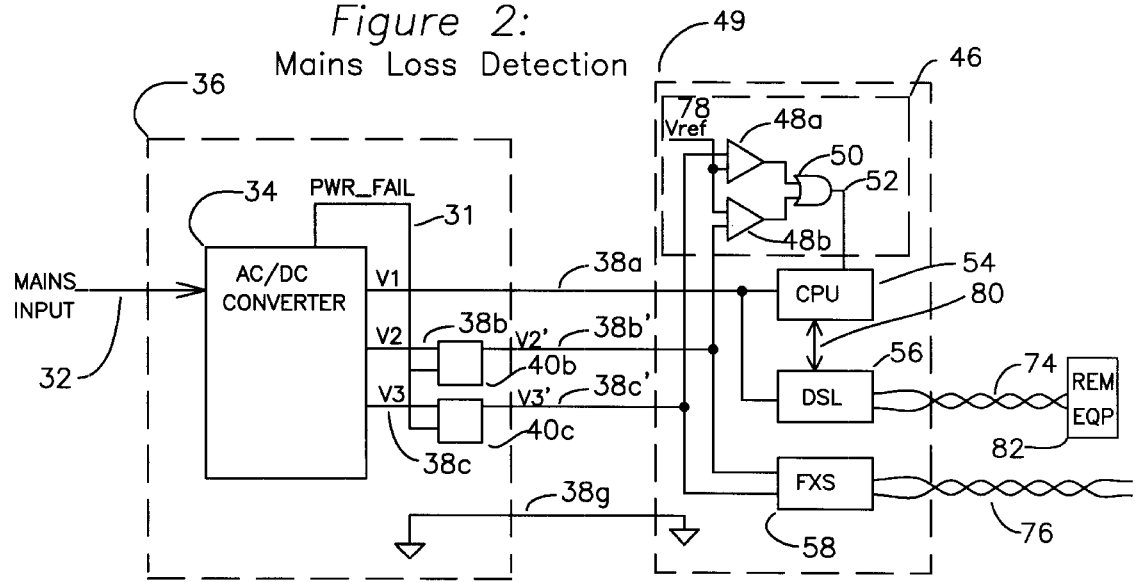

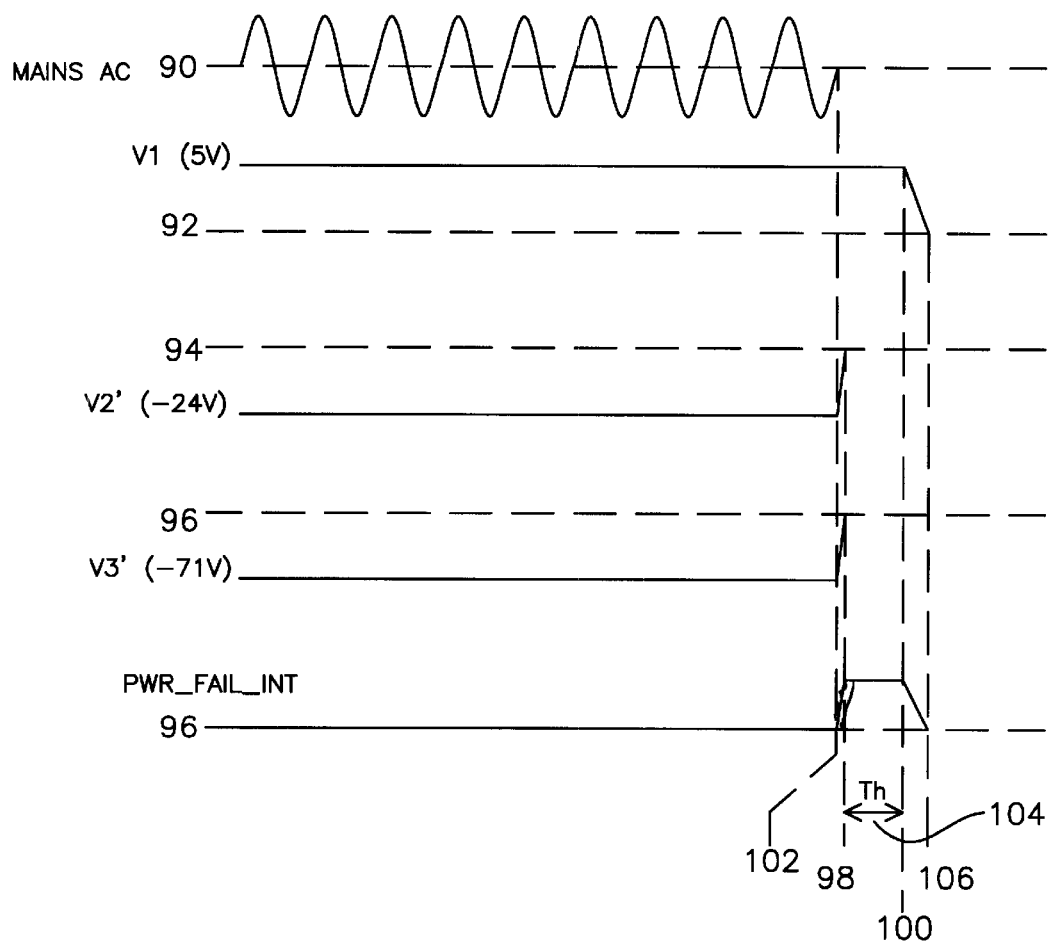

Shunt Signaler

Series Signaler

MAINS LOSS DETECTION APPARATUS AND METHOD

FIELD OF THE INVENTION

This invention relates to an apparatus and method for signaling the detection of mains power loss by locally powered equipment which has a communications link established with central equipment having backup battery power. Such detection of loss of mains power is often used to trigger housekeeping operations in a processor, whereby the processor shuts down in an orderly manner after the loss of mains power. This housekeeping may include the transmission of a power fail message to remote equipment prior to the loss of the mains-derived voltage which operates the processor.

BACKGROUND OF THE INVENTION

Communications equipment is often sensitive to the loss of mains power. In some systems, either a standby source of mains power is provided, or a method of detecting the loss of mains power is employed in conjunction with an energy storage element which provides enough energy for the powered equipment to complete any tasks that must be finished before the energy storage element is depleted.

One class of system extensively discussed in the prior art is one which senses a power fail event, and communicates this to a processor or system. U.S. Pat. No. 4,509,201 by Sekigawa et al discloses a voltage monitor coupled to a battery which signals when the battery has reduced operating level, thereby producing a signal to a CPU. U.S. Pat. No. 4,509,874 by Shimamoto et al. includes a variable A/D converter which measures the output voltage of two batteries and an AC/DC converter for use by a CPU. U.S. Pat. No. 5,831,805 by Sekine discloses a power failure detection subsystem for determining the loss of power and sending this information to a CPU.

A second class of system uses this loss of power signal to start a process related to saving information from a pre-existing process. U.S. Pat. No. 5,283,792 by Davies et al, U.S. Pat. No. 5,339,446 by Yamasaki et al, and U.S. Pat. No. 5,423,045 by Kannan et al. disclose the storage of CPU data and instructions upon the detection of power failure or imminent loss of power.

A third class of system uses a local capacitor to store sufficient charge to enable a system to operate on the content of this charge alone. U.S. Pat. No. 5,553,138 by Heald et al discloses a CPU which derives its power from a telephone hook voltage, and senses when the level of voltage on this storage capacitor is diminished, thereby producing a signal.

SUMMARY OF THE INVENTION

A power supply furnishes a plurality of voltages used as the power sources for various parts of a communication system. A CPU and a primary physical layer interface are powered using a first output voltage which persists for a holdup time after the loss of mains power. The remaining power supply secondary voltages are used for secondary physical layer interfaces, and other functions not related to the operation of either the primary physical interface, or the operation of the CPU. These secondary voltages have two values: an operating voltage related to the operation of the associated loads, and a signaling voltage for the communication of the detected AC mains power failure. When the power supply detects the loss of mains voltage, one or more of these power supply output secondary voltages is quickly pulled to this signaling voltage after the loss of mains power. A set of comparators examines one or more of the secondary power supply voltages, and these comparators generate an interrupt to the CPU if one or more of the other voltages is near the signaling voltage. In response to this detected signaling voltage, the CPU sends a special "power fail" message across the primary communications link to indicate to the remote device on this link that the provision of mains power has been terminated. In this manner, the remote device can distinguish between the loss of power to the remote device, and the loss of link through a bad interface, or a bad physical link.

OBJECTS OF THE INVENTION

A first object of the invention is the detection and communication of a mains power failure event in equipment that is powered by a plurality of power supply voltages. A second object of the invention is the use of one or more power supply first output voltages for powering equipment required for sending messages on a primary communications link, and the use of one or more power supply secondary output voltages for both the operation of secondary loads, as well as the signaling of loss of power information. A third object of the invention is the provision of power to a power fail messaging circuit for a holdup time that permits the sending of a power fail message after the detection of loss of power. A fourth object of the invention is the use of series signalers and comparators to send and receive power fail signals. A fifth object of the invention is the use shunt signalers and comparators to send and receive power fail signals.

DESCRIPTION OF THE DRAWINGS

FIG. 1 is the block diagram for a prior art communication system including a power fail signal.

FIG. 2 is the block diagram for the present invention comprising a power supply, powered equipment, and communication links to remote equipment.

FIG. 3 shows the waveforms for the mains failure signaling circus.

DETAILED DESCRIPTION OF THE INVENTION

Figure 4A:
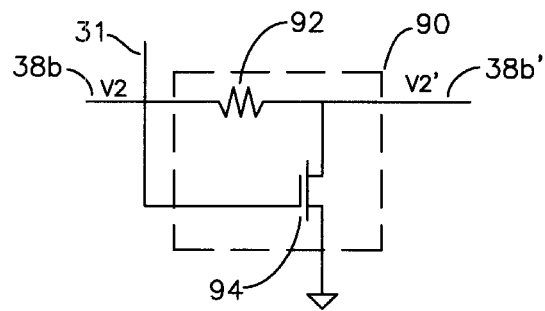
FIG. 4a is the schematic diagram for a shunt signaler.

FIG. 1 shows a prior art power source 10 having a plurality of output voltages V1 12a, V2 12b, and V3 12c, as well as a common ground 12g. A power fail signal 14 is also furnished, which is used to indicate the loss of mains power before the actual loss of output voltages occurs. The output voltages 12a–c and power fail signal 14 are provided to a communications device 16, which may have a plurality of communications interfaces such as a DSL (Digital Subscriber Link) 20, and an FXS (Full Exchange-Subscriber) interface 26 connected to a link 22. An FXS interface provides the electrical and functional behavior of a central office to a standard telephone, including the application of the ringing voltage of 71V, and the handset voltage of 24V. In a prior art system, when there is loss of mains power, the power fail signal 14 is asserted to the CPU 18, which may form a "power fail" message and send this over CPU interface 19 to the DSL physical layer controller chip 24. Thereafter, this "power fail," message is sent to the device on the remote end of link 20. The interval between loss of mains power and the sending of this "power fail" message determines the "holdup" time of the AC/DC converter 11, which is the amount of time the supply must continue delivering a specified voltage after the removal of mains power. During this holdup time, all of the other outputs 12b and 12c are also furnishing current to their respective load 26, even though these outputs are not essential to the communication of the power fail message. Also, the communication of a power fail message requires an additional pin and wire to transport this signal 14 from the power supply 10 to the powered equipment 16.

FIG. 2 shows the present invention. A power supply 36 comprises an AC/DC converter 34 which produces a power fail signal 31 and a plurality of output voltages V1 38a, V2 38b, V3 38c, and a common ground 38g, as before. Any voltage which is not used in the generation or transmission of the "power fail" message over the communication link is passed through signalers 40b and 40c. The signalers are controlled by the power fail signal 31 such that the secondary output voltages V2' 38b' and V3' 38c' are either disconnected from the active outputs 38b and 38c and discharged to ground, or are referenced to a signaling voltage such as ground. During this time, first output V1 38a maintains its output voltage. The advantage of signaling in this manner is clear to one skilled in the art of the design of switching power supplies. In a switching power supply, the mains voltage is rectified and stored in a central capacitor. The energy stored in a capacitor is $\frac{1}{2}(CV^2)$, and the rectified mains voltage is in excess of 150V. This is often the highest voltage typically found in the switching power supply, and this capacitor has a greater storage capacity than one placed for example at the output V1 38a, where the voltage is typically 3–5V. Prior art systems with a low voltage capacitor on V1 often place this capacitor in the powered equipment 49, whereas the optimal location for the high voltage capacitor is in AC/DC converter 34. The use of a central capacitor combined with a signaler for the outputs 38b, and 38c ' which isolates these loads has the effect to extending the holdup time of V1 38a. This provides a longer holdup time over either the alternative of placing a large capacitor at first output V1 38a, or allowing a central capacitor to operate the switching supply which is feeding secondary outputs V2' 38b' and V3' 38c'. The first output voltage 38a drives a load comprising a CPU 54 and a primary communications interface such as a DSL interface 56, both of which are powered by the voltage V1 38a, and require no other voltage for operation. The primary communication interface is shown as a DSL interface 56 which includes a link 74 to remote equipment 82, and this primary link is used for the transmission of IP and other protocols transporting data, as well as the transmission of a "power fail" message upon loss of power. The telephone FXS (or FXO) interface 58 consumes secondary voltages V2' 38b' and V3' 38c', which are typically –24VDC for the telephone line bias, and –71 VDC for a ringing voltage, as is well known to one skilled in telephone art. Following a loss of power, secondary voltages V2 38b and V3 38c produce signaling voltages using signalers 40b and 40c respectively, causing voltages V2' 38b' and V3' 38c' to fall from their operational level to the signaling level. This is detected by comparators 48a and 48b, which provide outputs to OR gate 50, which asserts output 52 whenever either V2' 38b' or V3' 38c' fall to the signaling level established by threshold level Vref 78. The assertion of power loss signal 52 causes the CPU 54 to generate a "power fail" message, send this message across link 80 to DSL interface 56, and out link 74 to the remote equipment 82. The remote equipment then marks the link end equipment 49 as powered down, rather than failed. The outputs of comparators 48a and 48b are logic state 0 when V2' and V3' are the operational voltage and logic state 1 when V2' and V3' are the signaling voltage.

FIG. 3 shows the voltages of the block diagram of FIG. 2. AC Mains voltage 90 is shown at nominal AC line voltage until point 102, when the AC mains are shown to fail. Until this time, V1 92, V2' 94, V3' 96 corresponding to respective nodes 38a, 38b, and 38c of FIG. 2 are all operational voltages of ±5V, –24V, and –71V respectively. At time 98, the secondary voltages V2' 94 and V3' 96 are isolated by signalers 40b and 40c, and thereafter fall to 0V as shown. The loss of these voltages is sensed by signal 52 of FIG. 2, shown as PWR_FAIL_INT waveform 96. The power converter continues to deliver first output voltage V1 during the holdup interval Th 104, which is a sufficient period of time for the CPU to receive the interrupt signal PWR_FAIL_INT 52 shown as waveform 96, generate a "power fail" message, transfer it over CPU bus 80, and send the message through DSL interface 56 through link 74 to remote equipment 82. The holdup interval Th 104 is chosen to enable this "power fail" message transmission to occur as described above, and a typical value for this holdup interval is 50 ms.

FIG. 4a shows the signaler 40b or 40c implemented as a shunt device. Signaler 40b is shown as shunt signaler 90 performing as 40b or 40c of FIG. 2, comprising a low value resistor 92 which does not interfere with the provision of voltage to the secondary loads as was described earlier. When a power fail event occurs, PWR_FAIL signal 31 is asserted as before, causing shunt switch 94 to reference V2' 38b' to ground. The duration of this assertion may be kept to a minimum, thereby reducing the power consumed by shunt switch 94.

Figure 4B:
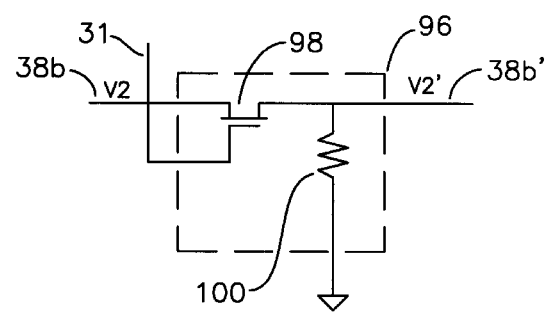
FIG. 4b is the schematic diagram for a series signaler.

FIG. 4b shows a series signaler 96 operating as signaler 40b or 40c. The series signaler 96 comprises a series switch 98 which becomes an electrical open upon the assertion of PWR_FAIL input 31. If required, shunt resistor 100 my be placed in parallel with the load to ensure the secondary output 38b' drops to the signaling level quickly. When PWR_FAIL input 31 is not asserted, switch 98 is closed, and output 38b' is at the operational output voltage.

As is clear to one skilled in the art, there are many different ways to practice the invention described in this letters patent. The AC to DC converter 34 may have a plurality of first outputs, or a plurality of secondary outputs, and the present invention only requires only that the first outputs be operational to each element responsible for the generation and transmission of the "mains failure" message for the duration required to form and transmit this message. One or more of the secondary voltage outputs is required to change to a signaling level to communicate the loss of power to the circuitry powered by the first outputs. One or more first voltages may be present, and one or more secondary voltages may be present without loss of generality, and these secondary voltages may power communications links, peripheral equipment, or any other function not related to the transmission of the "mains failure" message. While a level near 0V is shown for the messaging level used by the signalers, any such level which is unique from the operational voltage level could be used without loss of generality. Similarly, the signalers shown in FIGS. 4a and 4b are shown for example only, and could be made many different ways, as could the detector 46 of FIG. 2.

We claim:

1. An apparatus for the sending and detection of the loss of AC mains power comprising:

a power supply including:
  a mains AC to DC converter having a first output voltage and a plurality of second output voltages, each of said second output voltages having an operational value while said mains AC is present and a signaling value when said mains AC is not present, whereby after the removal of said mains AC, one or more of said second outputs is at said signaling value and said first output is maintained for a holdup time thereafter;
a network device including:
  a primary communications interface powered by said first output voltage;
  one or more secondary communications interfaces powered by one or more of said second output voltages;
  a CPU powered by said first output voltage and coupled to said primary communications interface and forming messages which are sent over said primary communications interface, said CPU having a power fail input and sending a power fail message over said primary communications interface when said power fail signal input is asserted;
  said power fail signal input asserted when one or more of said secondary output voltages is at said signaling level;
  where said power supply and said network device are interconnected only by said first voltage and said second voltages.

2. The apparatus of claim 1 whereby said secondary signaling voltage is within 1 volt of reference ground.

3. The apparatus of claim 1 whereby said primary communication interface is a Digital Subscriber Line.

4. The apparatus of claim 1 whereby at least one of said secondary communication interfaces is a Full Exchange-Office telephone interface.

5. The apparatus of claim 1 whereby at least one of said secondary communication interfaces is an Full Exchange-Subscriber telephone interface.

6. An apparatus for the sending and detection of the loss of AC mains power comprising:
a power supply including:
  a mains AC to DC converter having a first output voltage and a plurality of second output voltages, each of said second output voltages having an operational value while said mains AC is present and a signaling value when said mains AC is not present, whereby after the removal of said mains AC, one or more of said second outputs is at said signaling value and said first output is maintained for a holdup time thereafter;
a network device including:
  a primary communications interface powered by said first output voltage;
  a CPU powered by said first output voltage and coupled to said primary communications interface and forming messages which are sent over said primary communications interface, said CPU having a power fail input and sending a power fail message over said primary communications interface when said power fail signal input is asserted;
  said power fail signal input asserted when one or more of said secondary output voltages is at said signaling level;
  where said power supply and said network device are interconnected only by said first voltage and said second voltages.

7. The apparatus of claim 6 wherein said secondary signaling voltage is within 1 volt of reference ground.

8. The apparatus of claim 6 whereby said primary communication interface is a Digital Subscriber Line.

9. The apparatus of claim 6 whereby at least one of said secondary communication interfaces is a Full Exchange-Subscriber telephone interface.

10. The apparatus of claim 6 whereby at least one of said secondary communication interfaces is a Full Exchange-Office interface.

* * * * *